United States Patent
Kincaid et al.

(10) Patent No.: US 10,900,237 B2
(45) Date of Patent: Jan. 26, 2021

(54) WALLBOARD JOINT TAPE WITH FLUORESCENT COMPOUND

(71) Applicant: UNITED STATES GYPSUM COMPANY, Chicago, IL (US)

(72) Inventors: Tyler Kincaid, Chicago, IL (US); David D. Pelot, Chicago, IL (US); Salvatore C. Immordino, Jr., Trevor, WI (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 625 days.

(21) Appl. No.: 15/461,232

(22) Filed: Mar. 16, 2017

(65) Prior Publication Data

US 2018/0266120 A1    Sep. 20, 2018

(51) Int. Cl.
*E04F 13/04* (2006.01)
*D21H 21/30* (2006.01)

(52) U.S. Cl.
CPC .......... *E04F 13/042* (2013.01); *D21H 21/30* (2013.01); *Y10T 428/24802* (2015.01)

(58) Field of Classification Search
CPC ................. E04F 13/042; E04F 21/026; Y10T 428/24802; C09K 11/06; D21H 21/30
See application file for complete search history.

(56) References Cited

U.S. PATENT DOCUMENTS

| | | | |
|---|---|---|---|
| 3,075,853 A * | 1/1963 | Striker | C09J 7/22 428/343 |
| 6,645,338 B1 | 11/2003 | Sangani et al. | |
| 7,641,764 B2 | 1/2010 | Yoshida et al. | |
| 8,498,052 B2 | 7/2013 | Moon et al. | |
| 2002/0173562 A1 | 11/2002 | Flores | |
| 2005/0176878 A1* | 8/2005 | Ettl | C08F 251/00 524/571 |
| 2006/0191654 A1* | 8/2006 | Theisen | D21H 19/32 162/135 |
| 2007/0050927 A1* | 3/2007 | Cole | A61K 8/4926 8/636 |
| 2008/0128070 A1 | 6/2008 | Goldman | |
| 2008/0139064 A1 | 6/2008 | Neill et al. | |
| 2010/0170616 A1 | 7/2010 | Boss et al. | |
| 2011/0033693 A1 | 2/2011 | Little, Jr. | |
| 2014/0102652 A1 | 4/2014 | Wild | |
| 2015/0211189 A1 | 7/2015 | Anderson et al. | |
| 2017/0044062 A1 | 2/2017 | Kincaid et al. | |

FOREIGN PATENT DOCUMENTS

KR     2008-0098977 A     11/2008

OTHER PUBLICATIONS

"Fluorescent Brightener 351" as published on the internet Aug. 7, 2015 and acquired from https://web.archive.org/web/20150807205500/http://www.dyestuffinterrnediates.com/fluorescent-brightener/fluorescent-brightener-351.html (Year: 2015).*
International Search Report from corresponding International Patent Application No. PCT/US2018/022104, dated May 16, 2018.

* cited by examiner

*Primary Examiner* — Gerard Higgins

(74) *Attorney, Agent, or Firm* — Greer, Burns & Crain, Ltd.; Philip T. Petti; Pradip Sahu

(57) ABSTRACT

An identifiable wallboard joint tape is provided and includes a web of tape incorporated with an identifier such that the tape is visible under UV light and visually distinguishable from the surrounding wallboard joint and joint compound.

9 Claims, 11 Drawing Sheets
(10 of 11 Drawing Sheet(s) Filed in Color)

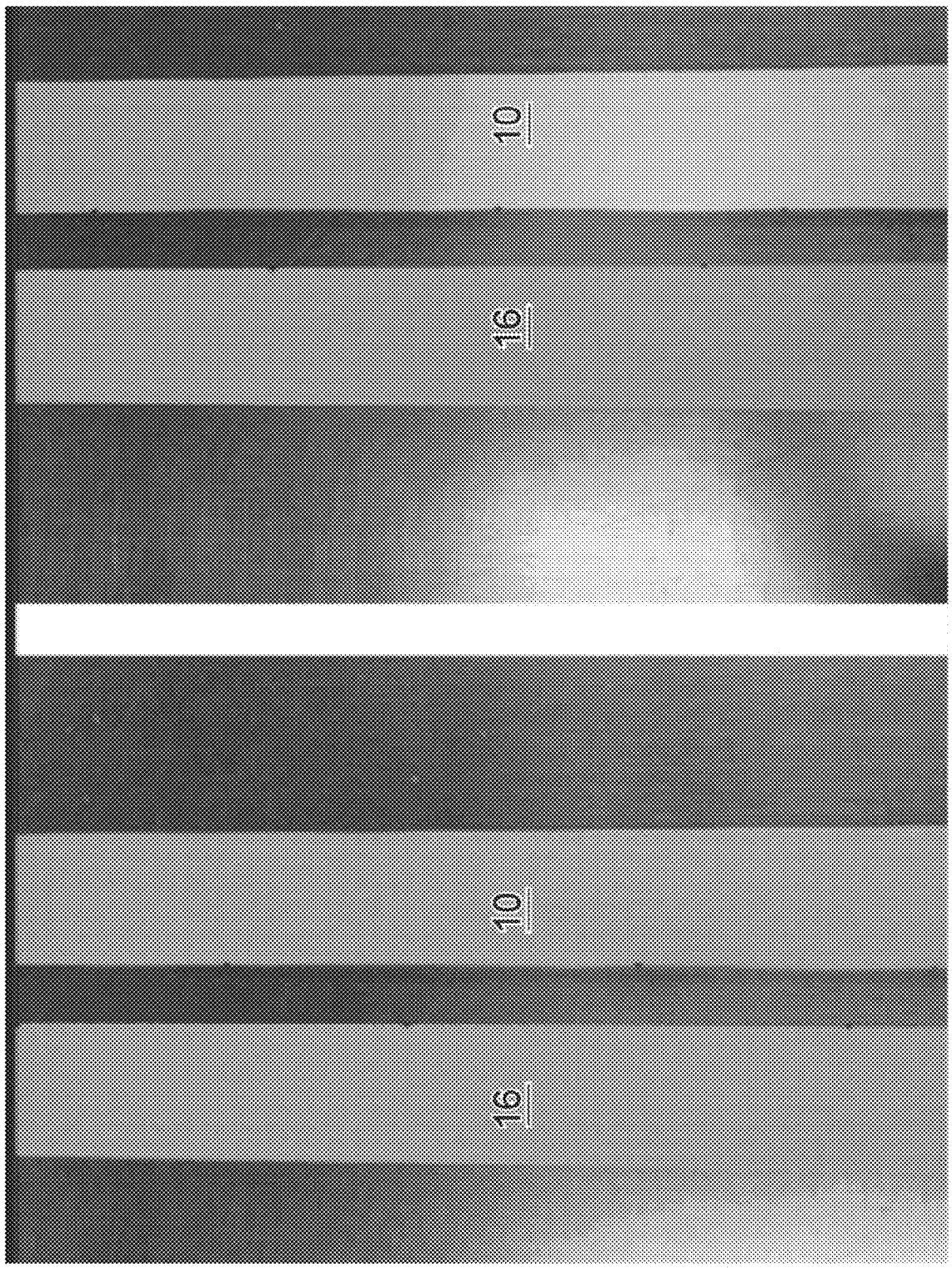

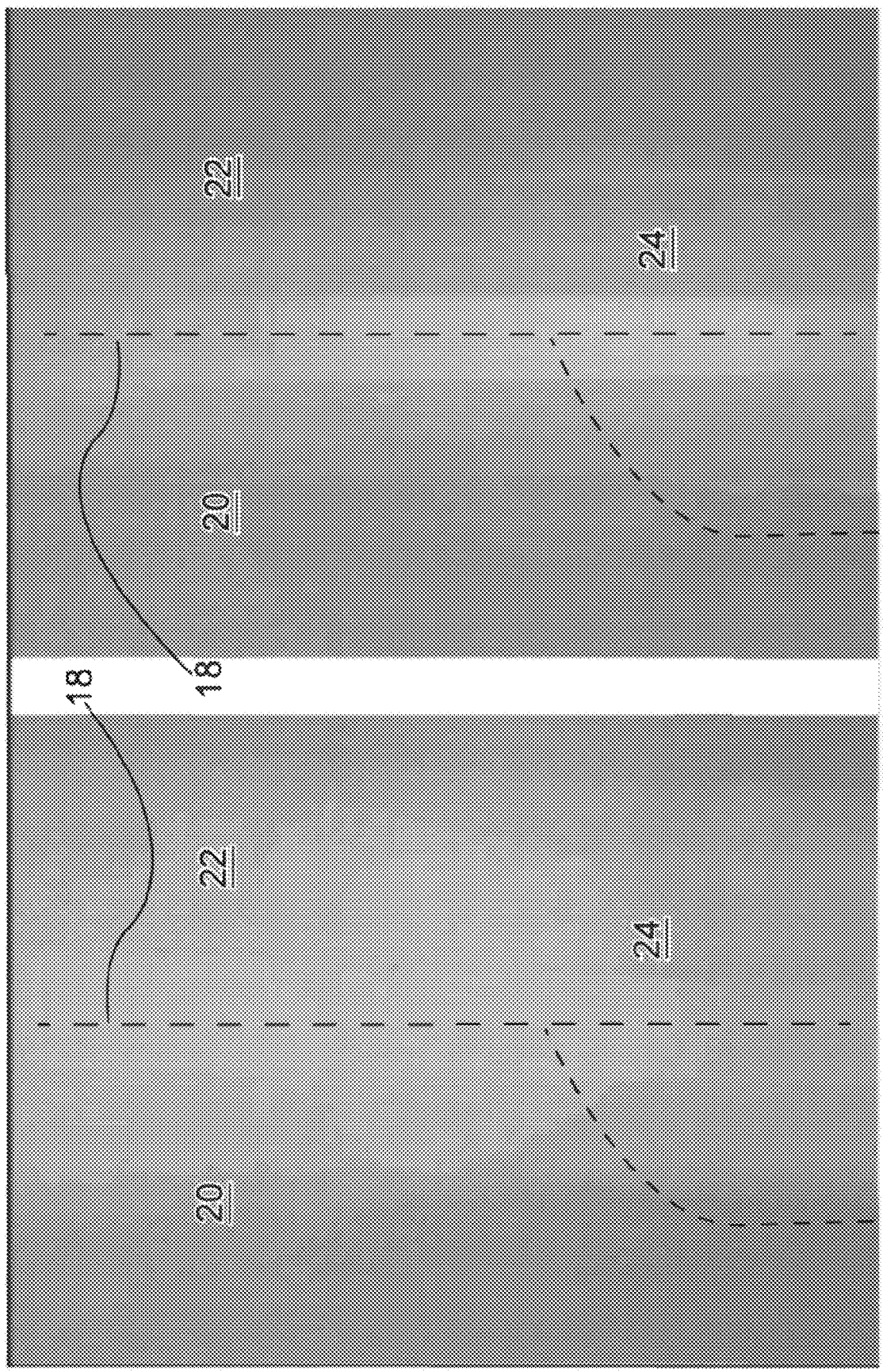

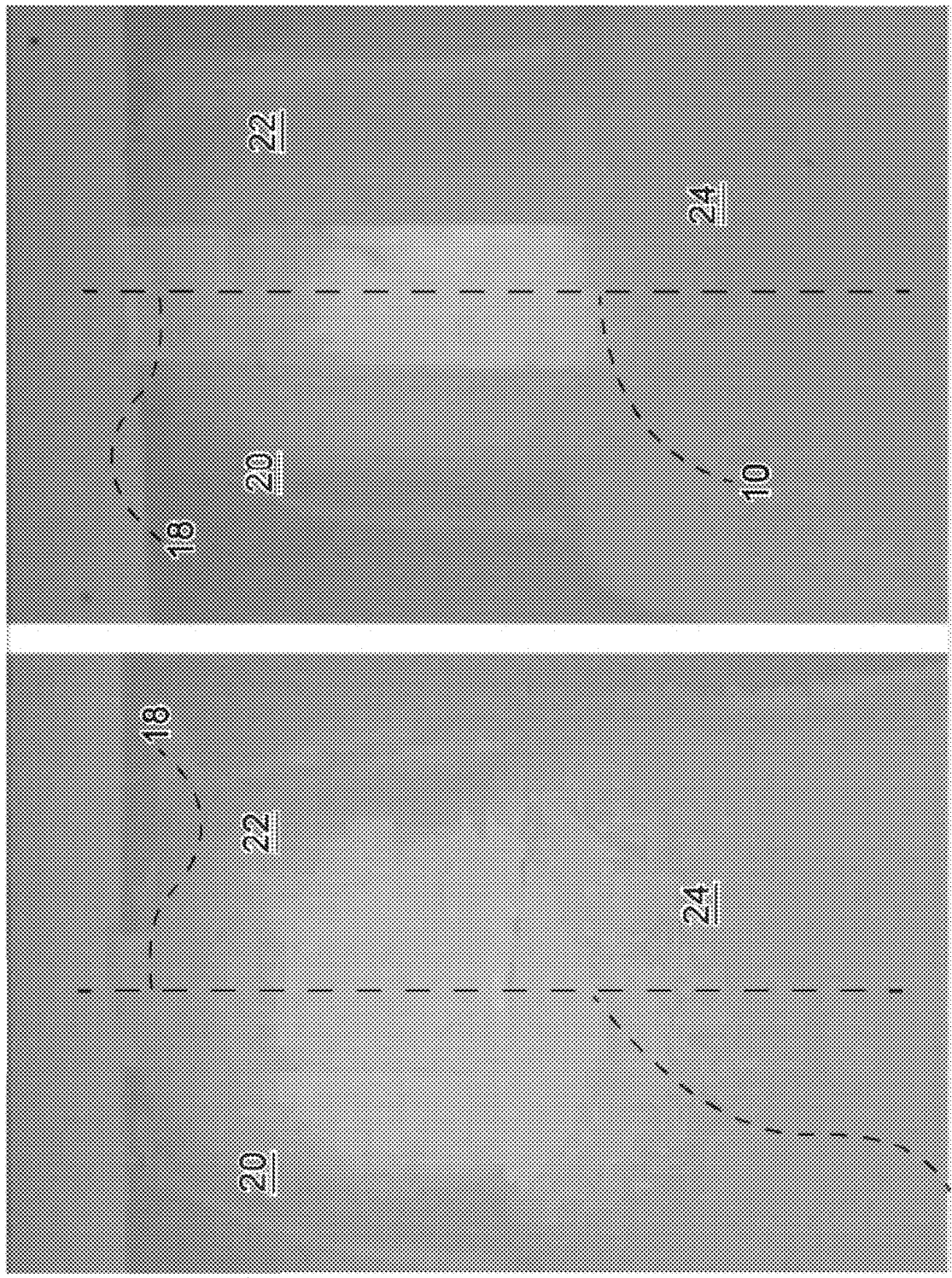

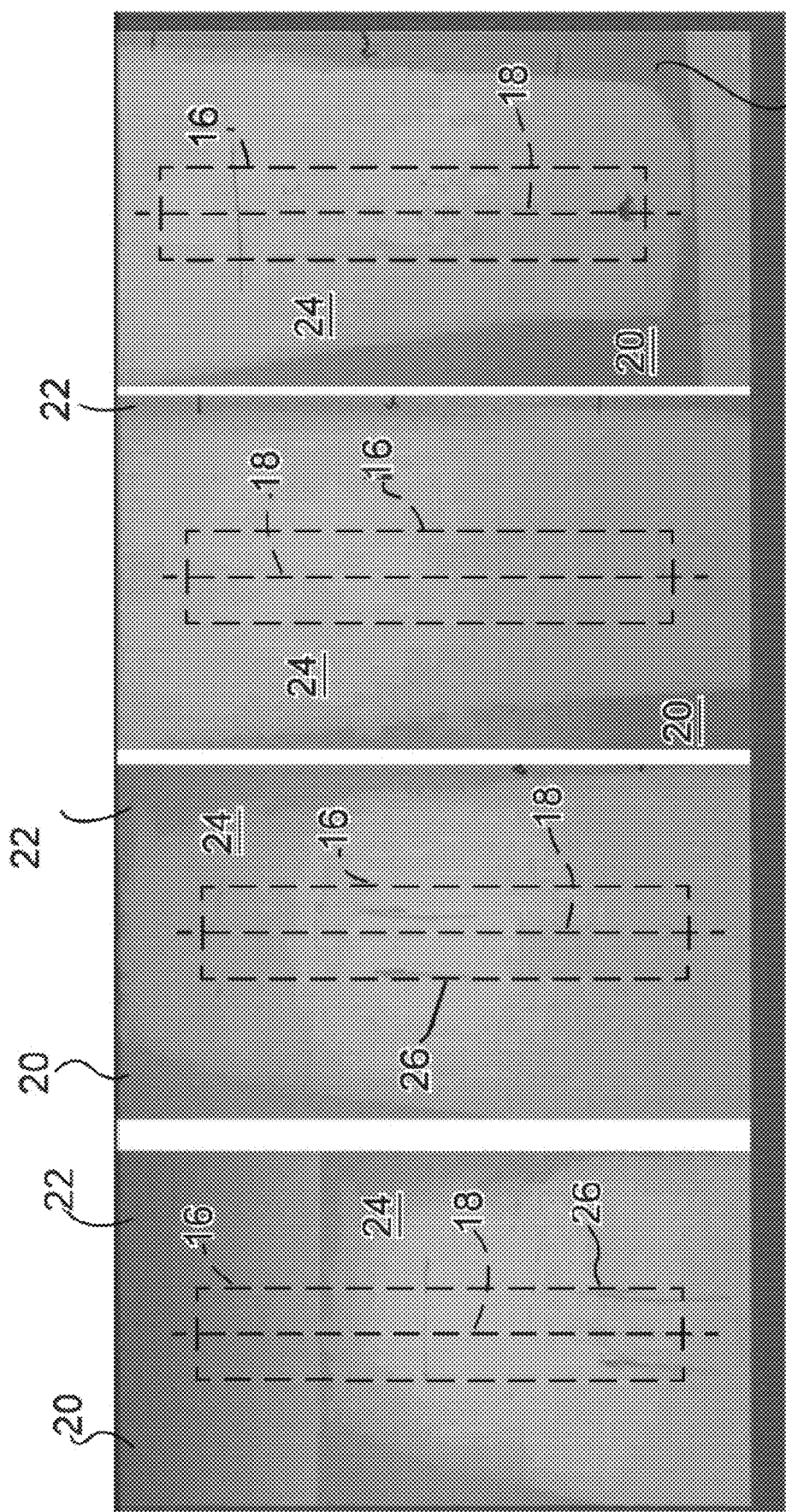

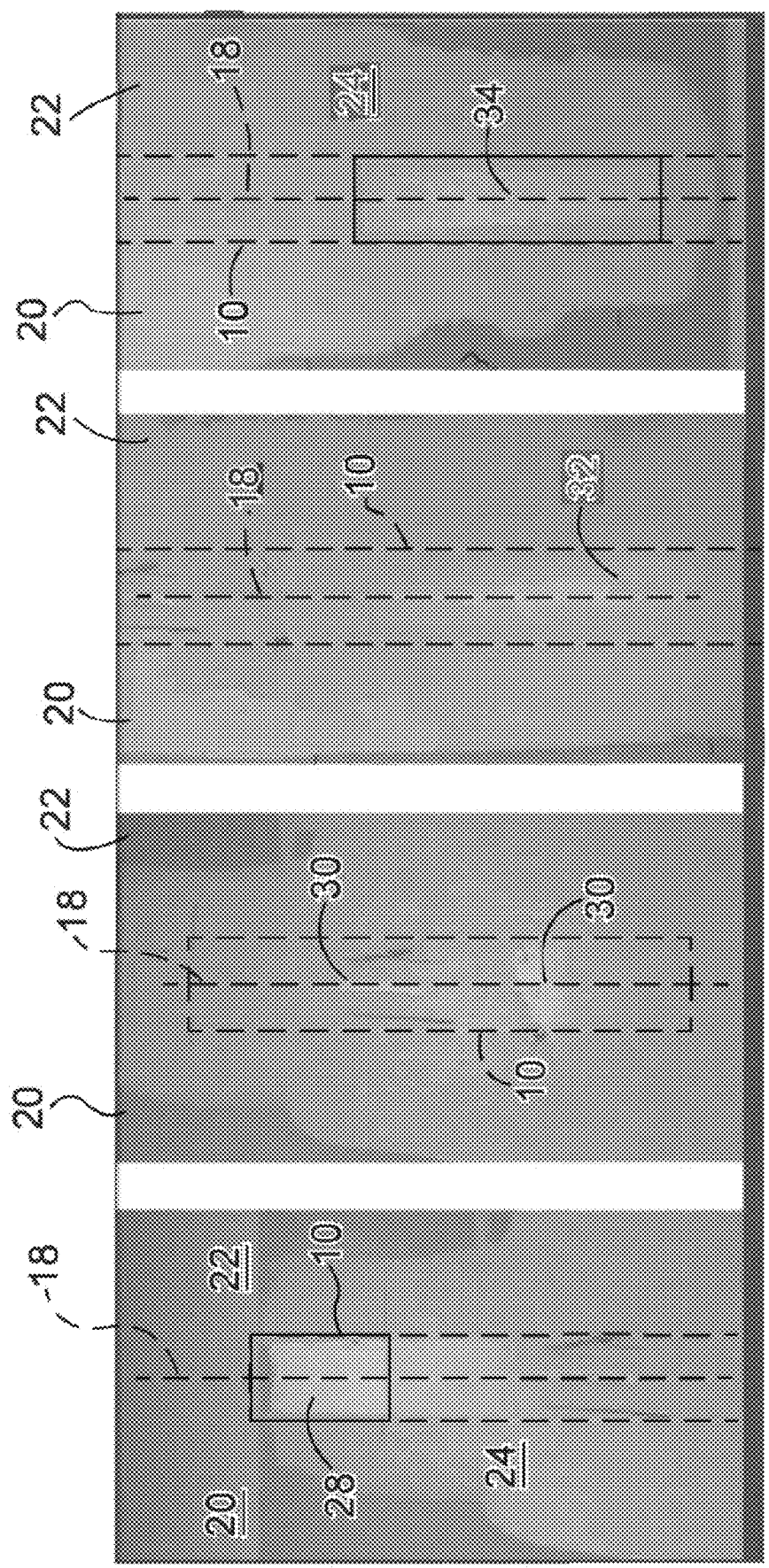

WALLBOARD JOINT TAPE WITH FLUORESCENT COMPOUND

BACKGROUND

The present invention relates generally to construction or remodeling materials that are identifiable through analysis of an identifier or tagging material, and more particularly to such materials used in conjunction with the application of wallboard panels to underlying framework and the resulting finishing operation.

In the construction of buildings, one of the most common elements is gypsum wallboard panels, often known as drywall, used in the construction of walls and/or ceilings. A slurry, including calcium sulfate hemihydrate and water, is used to form a core of the panel, and is continuously deposited on a paper cover sheet moving beneath a mixer. A second paper cover sheet, also referred to as a backing sheet is applied thereover and the resultant assembly is formed into the shape of a panel. Calcium sulfate hemihydrate reacts with the water to convert the hemihydrate into a matrix of interlocking calcium sulfate dihydrate crystals, causing it to set and to become firm. The continuous strip thus formed is conveyed on a belt until the calcined gypsum is set, and the strip is thereafter cut to form boards of desired length, which boards are conveyed through a drying kiln to remove excess moisture.

Walls and ceilings made from gypsum wallboard are conventionally constructed by affixing the panels to studs or joists and filling and coating the joints or seams between adjacent panels with a specially prepared adhesive called a joint compound. This process generally proceeds by placing a taping grade joint compound within the joint formed by the abutted edges of the wallboards and embedding a liquid-permeable tape within the taping compound. When dry (or set), a second coating including a topping grade joint compound is applied over the joint. This may be sanded lightly, then a third coat applied and conventionally finished. Another grade of joint compound is an all-purpose grade that may be used both for embedding the tape and for applying the finish coats.

When customers encounter a problem with a building product of this type, they typically contact a manufacturer of that product to report the defect. If the wallboard, joint compound or joint tape is applied by a contractor, as is often the case, the homeowner may not know what brand of building material has been used. Even if the homeowner does the work himself, he does not always save the label, container or other product identification. In these cases, it is not unusual for the homeowner to consult with or complain to a manufacturer with whom they are familiar, without being certain that the manufacturer actually made the gypsum-based building material installed in the owner's home.

The manufacturer then spends a significant amount of time investigating the source of the product about which they received a complaint. Often, they find that the product is that of another manufacturer and that the time spent on the investigation was wasted. Manufacturers of such products have a need for a way of quickly and easily, such as an onsite test, determining whether they actually made the joint compound that has been called into question.

As the customer base becomes familiar with the identification tagging of the manufacturer's product, a relationship is built based on the quality of the product. The identification tagging, then, not only serves to let the customer know which product is being used but they can associate the tag to the quality of the product.

Besides gypsum wallboard panels, joint compound, and joint tape, a number of other compositions are used in building construction or remodeling products. These include, but are not limited to, plaster, textures, poured flooring, acoustical products and fiberboard. Any of these compositions are susceptible to questions of identification if a homeowner is unsatisfied with the product performance.

Commonly-assigned U.S. Pat. No. 8,642,346 discloses a tagging material for the above-identified building products. However, in order to determine if the tagging material is present, the sample of building material must be sent to a laboratory for analysis. Such analysis consumes significant time between when the sample is taken and when the results are received, identifying the source of the product being analyzed.

SUMMARY

At least one of these or other problems is reduced using a wallboard joint tape that is uniquely identifiable. Preferably, the present tape is readily identifiable at the jobsite using a simple test, which identifies the tape immediately without interfering with a completed and finished wall joint. Thus, off-site analysis is no longer needed. It has been recently found that by enhancing the paper tape with an identifier, preferably a fluorescent agent or compound, the fibers become much more apparent and are significantly easier to observe and evaluate. In a preferred embodiment, the fluorescent agent is an optical brightener. Under normal or standard lighting conditions, the optical brightener is invisible. However, when exposed to ultraviolet (UV) light, such as through the use of a conventional UV black light, the wallboard joint tape with the identifier becomes fluorescent, readily identifiable and visually distinguishable from the surrounding wallboard joint and wallboard compound. Thus, when the present tape with identifier is employed in a wallboard joint, under normal lighting conditions, the tape may be visible, but is not optically or visually distinguishable from the surrounding wallboard joint and joint compound. However, upon exposure to UV illumination, the treated wallboard joint tape fluoresces or glows, in marked contrast to the surrounding joint and joint compound, and as such is visually distinguishable from the surroundings. In the present application, "visually distinguishable" refers to the present tape with identifier having an optical property, here fluorescence, which is lacking in the surround material, and thus the treated tape is easily distinguished.

Also, the preferred identifier is an optical brightener, similar to the compositions used in laundry detergents to brighten clothes. Another feature of the present composition is that the identifier is effective in extremely small doses, in the range of 0.001-0.01% by weight of an aqueous solution applied to the web of joint tape. It is also preferred that the amount of identifier is in the range of 0.003 to 0.007% by weight of an aqueous solution applied to the joint tape. An especially preferred amount of the identifier is an aqueous solution of 0.005 weight percent of the identifier.

Another feature is that the addition of the identifier enables identification of a specific paper wallboard joint tape in the field in the presence of an ultraviolet light source. A conventional and convenient UV light source is a hand-held UV blacklight. It is contemplated that the identifier is optionally incorporated into the web of joint tape either across the entire area or partially, using a pattern, design, logo, certification mark, or the like during the paper pulping process, or by embedding, coating, spraying, dipping, rolled, mist rolled, stamped or printed or otherwise surface treating the paper tape post production.

More specifically, an identifiable wallboard joint tape is provided and includes a web of tape incorporated with an identifier such that the tape is visible and visually distinguishable under UV light from the surrounding wallboard joint and joint compound. In an embodiment, the identifier is an optical brightener that is invisible under normal lighting conditions. In an embodiment the optical brightener is provided in the range of 0.001 to 0.01 weight percent of an aqueous solution applied to the web of tape. In an embodiment, the optical brightener is provided on an average of 0.005 weight percent in the aqueous solution applied to the web of tape. In an embodiment, the optical brightener has the formula $C_{28}H_{20}S_2O_6Na_2$. In an embodiment, the identifier is incorporated onto the web by formulation with the web, or by embedding, coating, spraying, dipping, rolled, mist rolled or otherwise surface treating the paper tape post production. The brightener is optionally applied in the shape of a desired design element, trademark, logo, certification symbol or the like.

In another embodiment, an identifiable wallboard joint tape is provided, including a web of tape incorporated with an identifier such that the tape is visible and visually distinguishable under UV light from the surrounding wallboard joint and joint compound, the identifier is an optical brightener provided in an aqueous solution in a range of 0.001 to 0.01 weight percent, and the brightener has the formula $C_{28}H_{20}S_2O_6Na_2$.

In yet another embodiment, a method of making an identifiable wallboard joint tape, is provided, including providing a web of wallboard joint tape; incorporating a suitable amount of an optically detected identifier into the joint tape to be sensed by a conventional detecting device; applying the joint tape with the identifier in a conventional manner in the course of building construction, creating a finished wallboard joint with the tape and multiple applications of wallboard joint compound; and analyzing the finished wallboard joint and optically detecting the presence of the identifier in real time onsite. In an embodiment, the identifier is an optical brightener and is uniformly distributed on the tape by formulation with the tape or by embedding, coating, spraying, dipping, rolled, mist rolled or otherwise surface treating the paper tape post production.

In an embodiment, the identifier is provided in concentration in an aqueous solution in the general range of 0.001% to 0.01% weight percent. In an embodiment, upon analyzing the finished joint by illumination under UV light, the identifier is visible and visually distinguishable from the surrounding wallboard joint and joint compound across the entire web of joint tape. In an embodiment, the identifier is provided in concentration in an aqueous solution in the general range of 0.003 to 0.007 weight percent of an aqueous solution applied to the joint tape. In another embodiment, the identifier is provided to the tape in an aqueous solution in a concentration of equal to or greater than 0.0069 weight percent.

BRIEF DESCRIPTION OF THE DRAWINGS

The patent or application file contains at least one drawing executed in color. Copies of this patent or patent application publication with color drawing(s) will be provided by the Office upon request and payment of the necessary fee. FIGS. 1a-b are a plan view of two wallboard tapes, control and treated, under normal illumination on the left (1a), and under UV illumination on the right (1b);

FIGS. 2a-b depict a partially finished wallboard joint having a coat of joint compound covering the present tape under normal illumination on the left (2a), and under UV illumination on the right (3b); FIG. 3a-b depict a partially finished wallboard joint having a second coat of joint compound freshly applied over the joint of FIG. 2, under normal illumination on the left, and under UV illumination on the right;

FIGS. 5a-d are a collection of four views of a finished wallboard joint, with zones showing control tape and treated tape under UV illumination;

FIGS. 6a-d show the finished wallboard joint of FIGS. 4a-d with surface partial removal and illuminated by UV light;

DETAILED DESCRIPTION

Figures 4A, 4B:
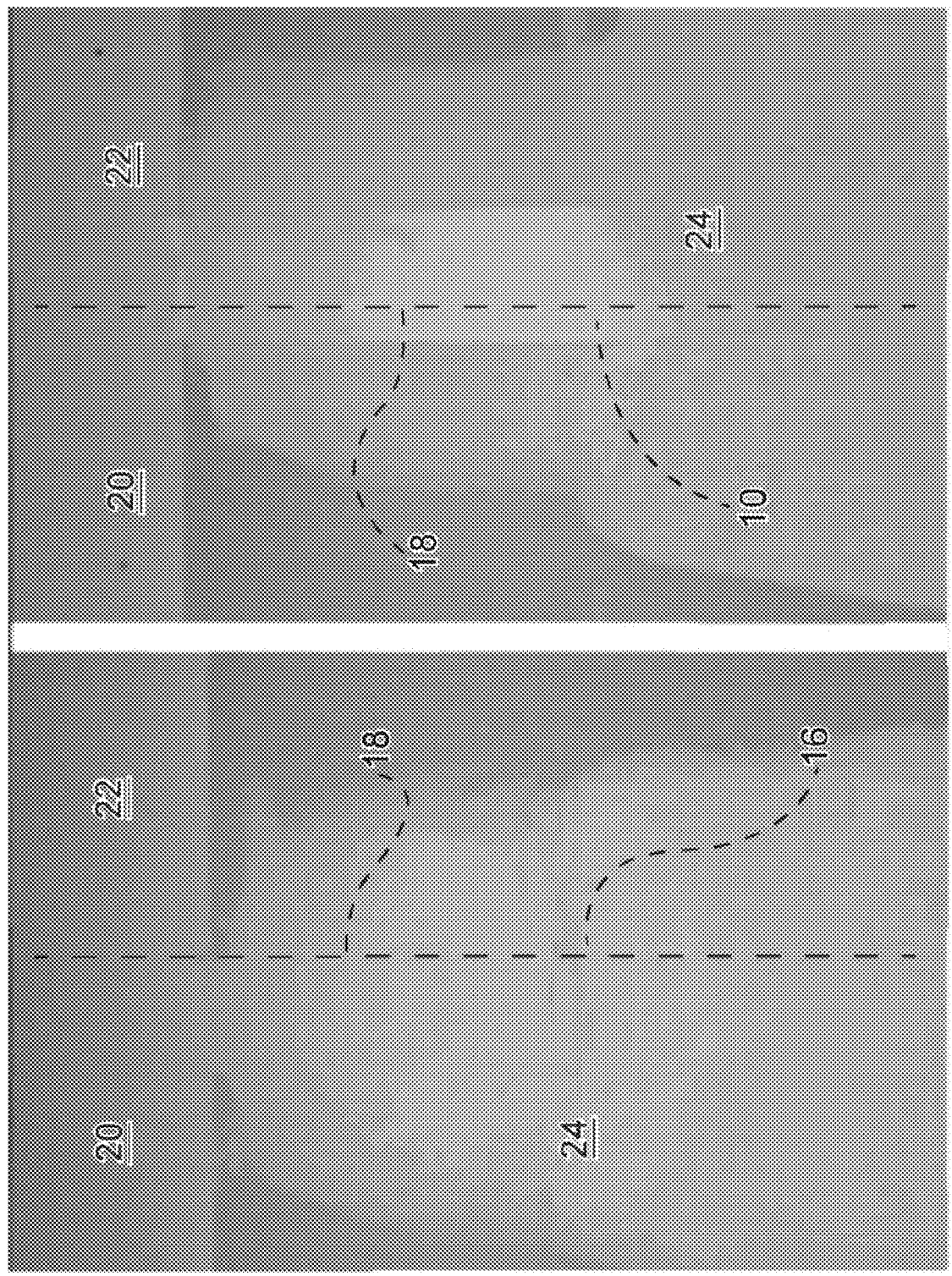
FIG. 4a-b are views of the same wallboard joint in FIGS. 4a-b after drying, the left side under normal illumination, the right side under UV illumination.

The present wallboard joint tape is provided to address the situation where there is a need for identifying a joint tape as originating with a particular manufacturer. In such occasions, it is advantageous to provide an identifier material to the joint tape, such as a fluorescing agent, also referred to as a tagging agent. Adding the identifier to the joint tape preferably occurs at the conclusion of product manufacture. In the preferred embodiment, after the tape has been sliced and sanded to improve bonding with the joint compound, the identifier material is applied by embedding, coating, spraying, dipping, rolled, mist rolled or otherwise surface treating the paper tape post production. However, it is also contemplated that the identifier is integrally incorporated with the wallboard tape during the formulation of the paper tape, with the identifier being part of the pulp slurry.

In the preferred embodiment, the identifier material is Benetex® OB-M1 fluorescent Whitening Agent, also referred to as an optical brightener, produced by Mayzo, Inc., Suwanee, Ga. 30024. The preferred optical brightener is a derivative of distyryl biphenyl (DSBP) compound, with a formula of $C_{28}H_{20}S_2O_6Na_2$. Other optical brighteners are well known in the art of laundry detergent formulation, and are also considered suitable for the present composition. As discussed below, it has been found that the weight percentage of the identifier/optical brightener can be very low and still achieve the desired visual distinguishability when samples are viewed in the field using handheld UV lights. Accordingly, the present optical brightener is preferably provided in a weight percentage in the range of 0.001 to 0.01 weight (wt.) percent of an aqueous solution that is applied to the joint tape, such as by embedding, coating, spraying, dipping, rolled, mist rolled or otherwise surface treating the paper tape post production. A more preferred range of the optical brightener is approximately 0.003 to 0.007 wt. percent. Most preferably, the optical brightener is effective or visually distinguishable when applied in an aqueous solution where the optical brightener concentration is equal to or greater than 0.0069 wt. percent, and even more preferably 0.005 wt. percent. Thus, the brightener is effective and visually distinguishable under UV light at very low doses.

After the present tape has been incorporated with the identifier and applied to a wallboard joint, the identifier is invisible to the eye under normal or standard lighting conditions, defined as conventional room illumination using fluorescent, incandescent and/or LED bulbs and fixtures or the like with optional ambient natural light when windows are present. Upon exposure of the present tape, or the associated wallboard joint to UV light, as through a handheld UV blacklight used under standard lighting conditions described above, the indicator will fluoresce sufficiently to be detectable and visually distinguishable by the naked eye. As such, when exposed to UV light, the present tape is visible and visually distinguishable from the surrounding wallboard joint and joint compound, typically by fluorescing.

Referring now to FIGS. 1a and 1b, webs or strips of the present wallboard tape 10 having the present identifier applied in an aqueous solution of 0.005 wt. percent are shown placed next to a control or untreated tape 16 illuminated under normal or standard light in FIG. 1a, and using a flashlight-style handheld UV light with normal-or standard light in FIG. 1b. It is seen in FIG. 1b that the treated tape 10 is significantly more visible and visually distinguishable under UV light.

Referring now to FIGS. 2a and 2b, a wallboard joint is designated 18 (shown hidden) and represents the intersection of panels 20 and 22. In FIG. 2a, the untreated tape 16 has been applied to the joint, covered with a layer of joint compound 24 and illuminated with UV light. It will be seen that the tape is relatively invisible. In FIG. 2b, the tape 10 with the indicator has been applied to the joint 18 and was covered by a thin layer of joint compound 24 as is common in the initial stages of forming the taped wallboard joint, as is well known in the art. Again, in FIG. 2b, upon exposure to UV light, the tape 10 with the indicator is highly visible and visually distinguishable through the joint compound 24.

Referring now to FIGS. 3a and 3b, the joint 18 of FIGS. 2a and 2b is shown with another layer of joint compound 24 applied after the first layer has dried, again as is common in the art. Upon exposure to UV light in FIG. 3a, with the second layer or joint compound 24 still wet, the untreated tape 16 is barely visible, while in FIG. 3b, the treated tape 10 is highly visible and is visually distinguishable from the surrounding wallboard joint 18 and the joint compound 24.

Referring now to FIGS. 4a and 4b, the joint 18 is shown after the second layer of joint compound 24 has dried. In FIG. 4a, the untreated tape 16 is invisible under UV light, while in FIG. 4b the treated tape 10 with the identifier is highly visible to UV light and is visually distinguishable through multiple layers of joint compound 24.

Referring now to FIGS. 5a-d, several views of the joint 18 with the untreated tape 16 are shown exposed to UV light. At this stage, the joint 18 is completed, with several layers of joint compound 24 applied, dried and sanded, as is the well-known custom in the art. In FIGS. 5a and 5b, the position of the tape 16 is marked by lines 26.

Referring now to FIGS. 6a-6d, several views are provided of the joint 18 with the treated tape 10 having the present identifier. In these views, the layers of joint compound 24 have been partially removed using various techniques in the manner used in the field by inspectors in the process of studying the effectiveness of a conventional wallboard joint finishing procedure. In FIG. 6a, the joint compound 24 has been removed by digging it out in a region 28 to expose the tape 10. As seen, under UV illumination, the tape 10 is highly visible and visually distinguishable from the surrounding joint compound 24 and the joint 18. In FIG. 6b, the joint compound 24 has been scored heavily with a knife at 30 in two regions. In FIG. 6c, the joint compound 24 has been sanded in the region 32 to expose the tape 10, which is highly visible and distinguishable under UV light. Lastly, in FIG. 6d, the joint compound has been selectively picked away in region 34 to reveal the tape 10, again highly visible and distinguishable under UV light. As indicated above, the UV light is applied with normal illumination in the room.

Figures 7A, 7B:
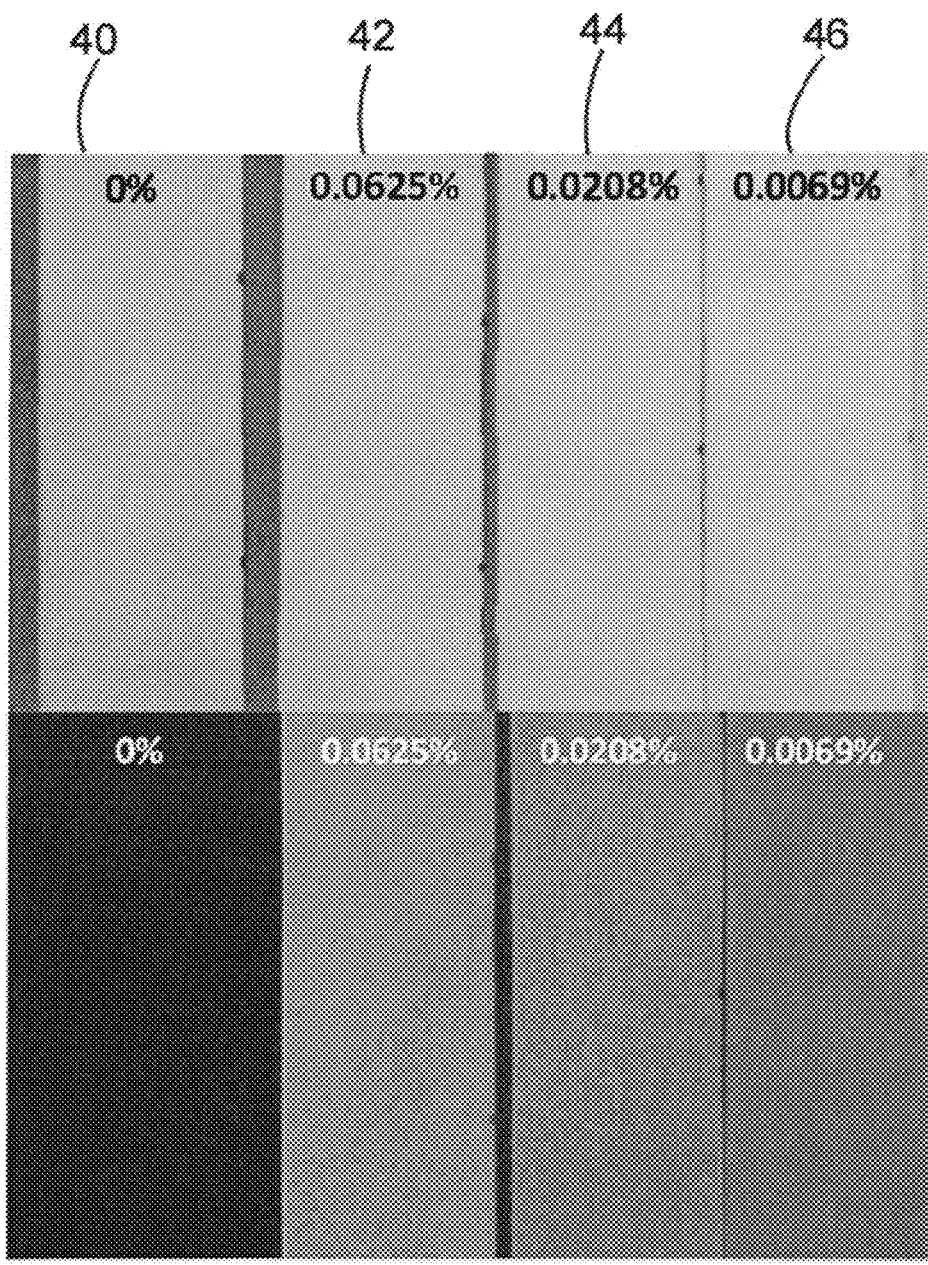
FIGS. 7a-b depict four strips of wallboard tape with varying concentrations of the present brightener, shown in normal illumination at the top half (7a), and under UV illumination at the bottom half (7b)

Referring now to FIGS. 7a and 7b, four strips of joint tape are shown placed on a substrate, such as the wallboard panel 20, with a strip 40 being untreated with any optical brightener, a strip 42 having the optical brightener incorporated into the tape at 0.0625 wt. %; a strip 44 having the optical brightener incorporated at 0.0208 wt. %, a strip 46 having the optical brightener incorporated at 0.0069 wt.%. In FIG. 7a at the top half of the image, the strips 40-46 are shown under standard or normal interior illumination. In FIG. 7b, at the bottom half of the image, the strips 40-46 are shown under UV light as described above, sourced from a UV fluorescent tube, with normal interior illumination turned off. Note that while under normal illumination, all of the strips 40-46 appear the same and are visually indistinguishable from each other, under UV illumination, all of the treated strips 42-46 are visible and visually distinguishable from the untreated strip, even at the relatively low concentration of 0.0069 wt.%. Thus, the present wallboard joint tape is visually distinguishable with brightener concentrations in an aqueous solution of equal to or greater than 0.0069 wt. %.

Figures 8A, 8B:
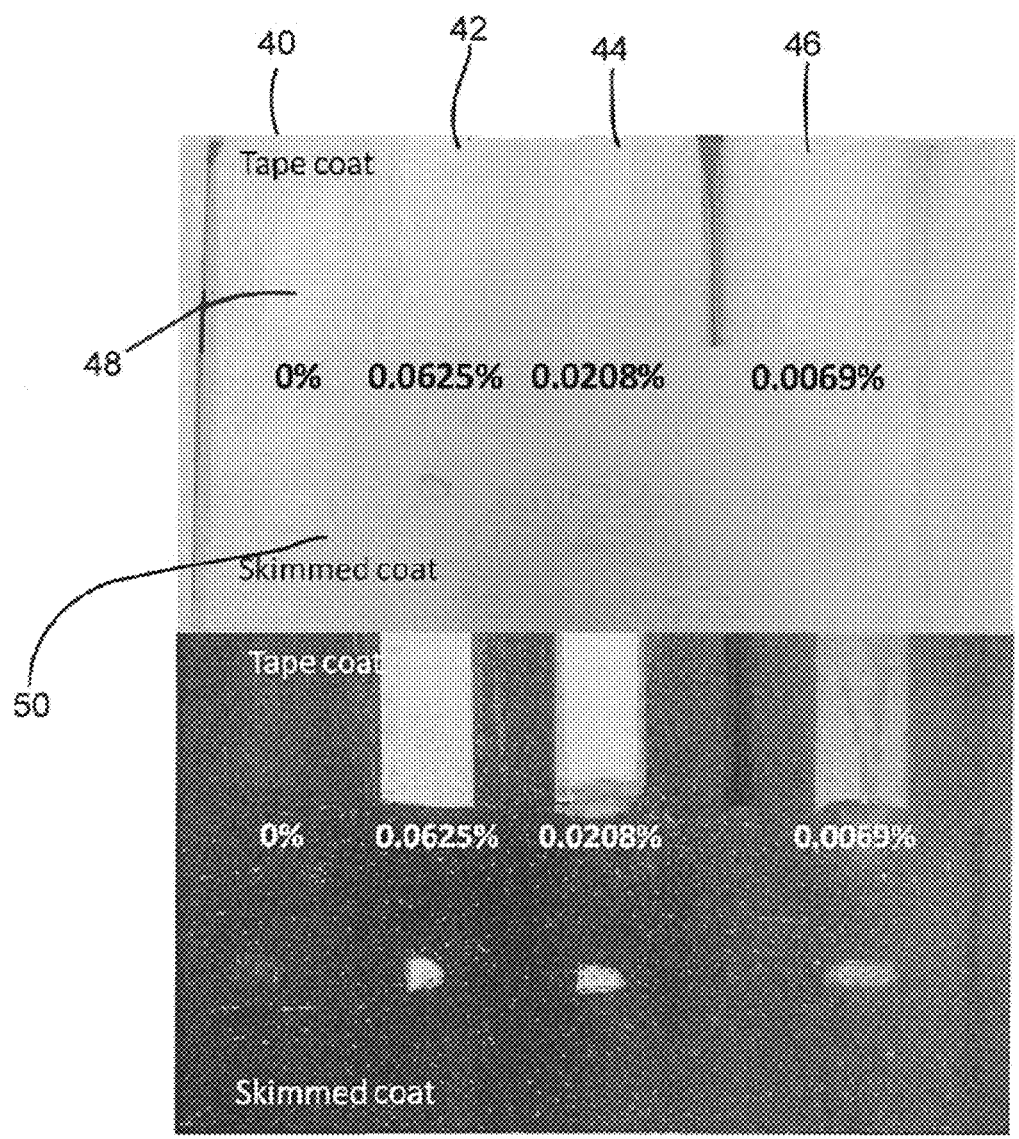
FIGS. 8a-b depict the four strips of wallboard tape shown in FIGS. 7a-b and covered with a skim coat of wallboard joint compound, shown under normal daylight illumination at the top half (8a), and under UV illumination at the bottom half (8b)

Referring now to FIGS. 8a and 8b, the four strips 40-46 described above are shown coated with a thin layer of tape coat of joint compound 48, then covered with another relatively thin skim coat of joint compound 50, as is common in the art during the wallboard joint taping process. In FIG. 8a, the strips are shown under standard or normal daylight artificial illumination, as described above. In this view, all of the strips 40-46 are covered with joint compound and are visually indistinguishable from each other. However, in FIG. 8b, under UV illumination, all of the treated strips 42-46 are visually distinguishable from the untreated strip 40, even the strip 46 with the lowest concentration of optical brightener at 0.0069 wt. %.

Figure 9:
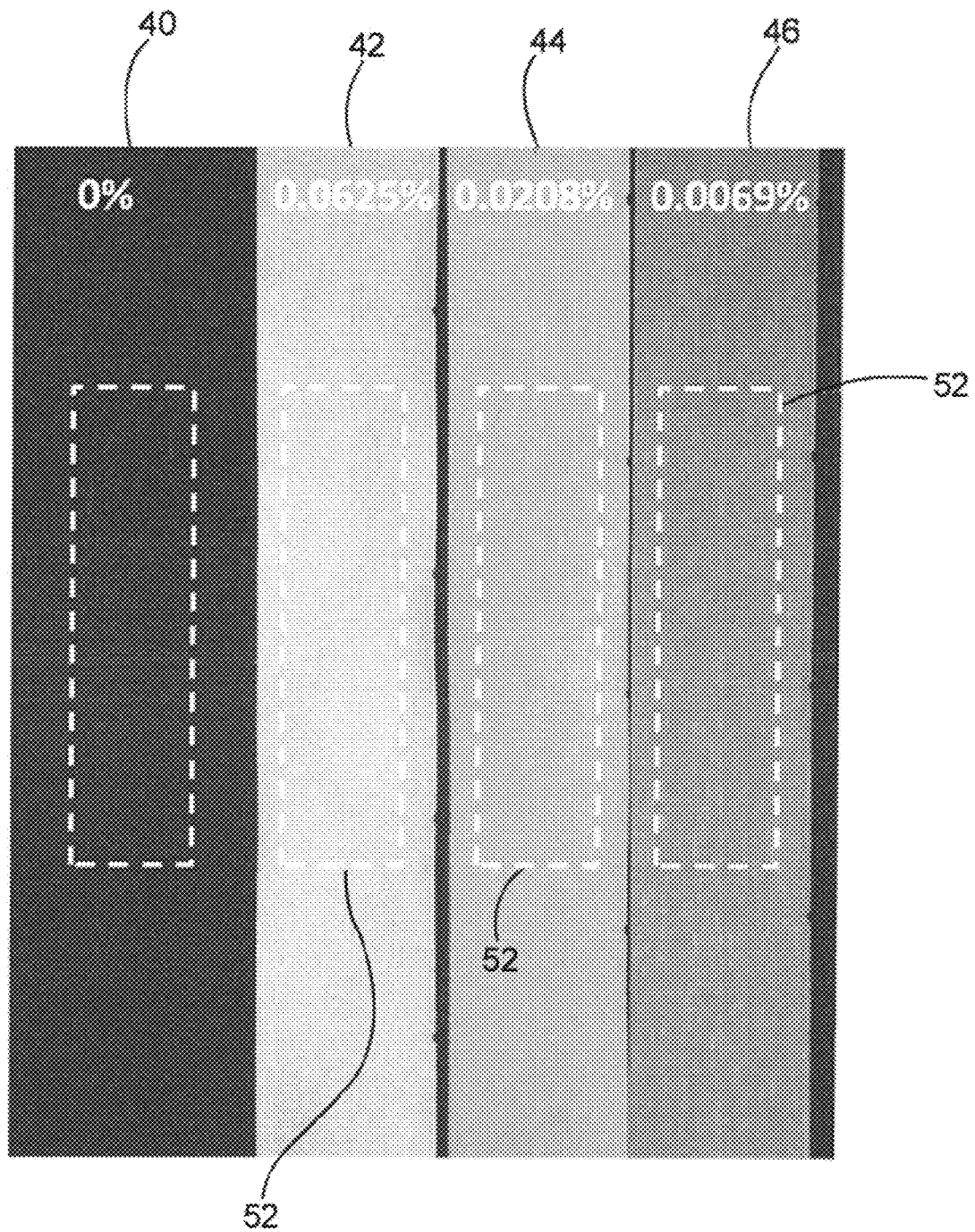
FIG. 9 shows the four strips of wallboard joint tape shown in FIGS. 8a-b covered in a completed wallboard joint with multiple layers of joint compound, with the tape shown in dashed lines, and exposed to UV illumination.
Figure 10:
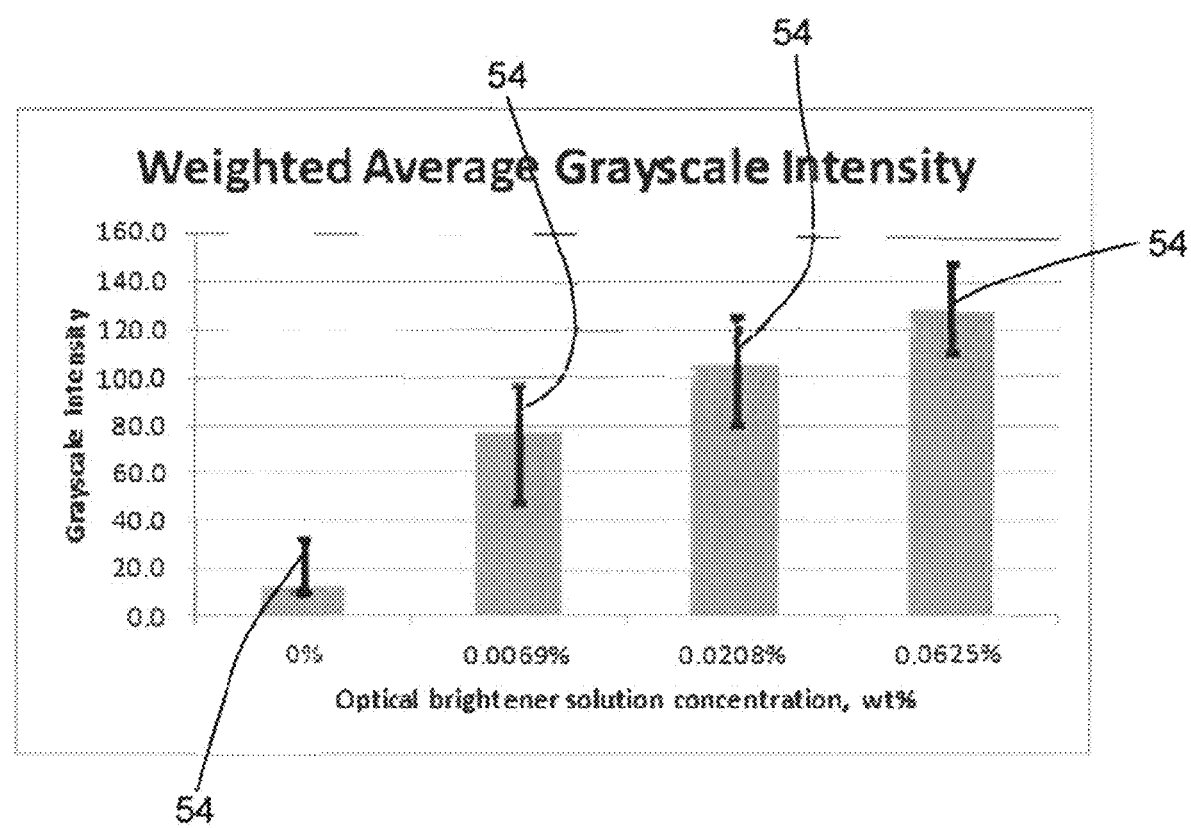
FIG. 10 is a plot of Weighted Average Grayscale Intensity vs. Optical brightener solution concentration, weight %.

Referring now to FIG. 9, which shows the same tape samples, strips 40, 42, 44, and 46, as FIG. 7 but are shown converted to grayscale for image processing. By converting the images to grayscale and then measuring the grayscale intensity, the brightness of each tape, under exposure to UV light only, can be measured and compared. The dashed white box at 52 drawn on each of the tape samples designates the area that was used for image processing. The results of the image processing are shown in FIG. 10. Even without an image processing technique it is clear that all of the treated strips 42-46 are visually distinguishable from the untreated strip 40, even the strip 46 with the lowest concentration of optical brightener. Referring now to FIG. 10, a graphical comparison of the weight percent of optical brightener with a weighted average of Grayscale Intensity is plotted for each of the test wallboard tape strips 40-46 described above. As is known in the art, Grayscale Intensity measures the "whiteness" of a colored surface, with 0.0 Intensity designating the blackest "black," with absolutely no "whiteness," and 255.0 is the extreme whitest "white." The vertical error bars 56 reflect the range of test values from the lightest to the darkest pixel measured from each sample of the tape 40-46 using computer software known in the art. The tape samples 46 received a 77.7 Intensity, which, as discussed above, is visually distinguishable from the control strip 40 under UV light, whether or not the tape is exposed on a substrate, or is covered with several layers of wallboard joint compound as is customary in the wallboard joint finishing process. The tape samples 44 received an Intensity of 105.6, and the samples 42 received an Intensity of 128.5, both of which are also discussed above as being visually distinguishable over the control strip 40.

Figure 11:
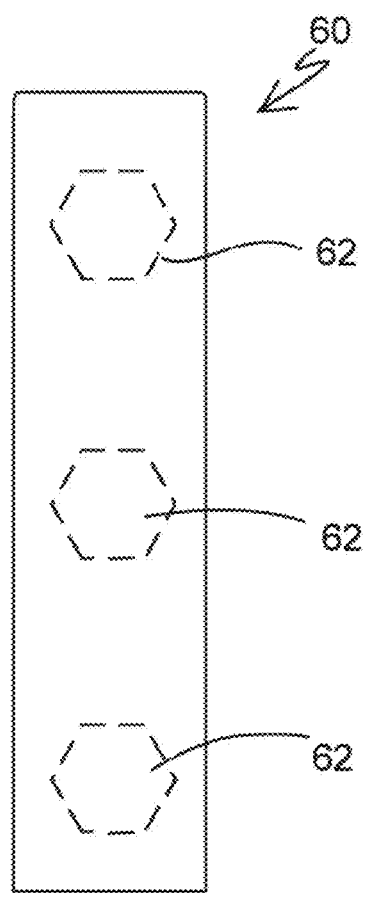
FIG. 11 is an embodiment of the present joint tape with the identifier applied in a design.

Referring now to FIG. 11, an alternate embodiment of the present joint tape is generally designated 60. The tape 60 shares all of the above-described characteristics of the tape 10 described above, with the main distinction being that the identifier, shown here as 62, is applied in a distinct pattern, logo, certification symbol or the like on the tape, rather than being sprayed or otherwise applied or impregnated across the entire strip of tape. Since the tape 10 is often produced and sold in rolls, the identifier pattern 62 is contemplated as being applied in regular intervals along the strip of tape.

While a particular embodiment of the present fluorescent joint tape has been described herein, it will be appreciated by those skilled in the art that changes and modifications may be made thereto without departing from the invention in its broader aspects and as set forth in the following claims.

The invention claimed is:

1. An identifiable wallboard joint, comprising:
   two wallboard panels having a wallboard joint therebetween;
   an identifiable wallboard joint tape applied to the wallboard joint, wherein the identifiable wallboard joint tape comprises a web of liquid permeable paper wallboard joint tape integrally incorporated with an optical brightener, which is formed by applying an aqueous solution having the optical brightener in the range of 0.001 to 0.01 weight percent to the web of wallboard joint tape; and
   a layer of joint compound covering the identifiable wallboard joint tape, wherein under standard lighting conditions, said optical brightener is invisible and wherein said identifiable wallboard joint tape is visible and visually distinguishable under UV light from the wallboard joint.

2. The identifiable wallboard joint of claim 1, wherein said optical brightener is provided in an aqueous solution on an average of 0.005 weight percent, said solution being applied to said web of joint tape.

3. The identifiable wallboard joint of claim 1, wherein said optical brightener has the formula $C_{28}H_{20}S_2O_6Na_2$.

4. The identifiable wallboard joint of claim 1, wherein said optical brightener is provided to said web of joint tape in an aqueous solution in a concentration equal to 0.0069 wt. %.

5. The identifiable wallboard joint of claim 1, wherein said optical brightener is applied on said web of joint tape in a pattern.

6. An identifiable wallboard joint, comprising:
   two wallboard panels having a wallboard joint therebetween;
   an identifiable wallboard joint tape applied to the wallboard joint, wherein the identifiable wallboard joint tape comprises a web of liquid permeable paper wallboard joint tape incorporated with an optical brightener, which is formed by applying an aqueous solution having the optical brightener in a concentration of 0.005 weight percent to the web of wallboard joint tape, and wherein said brightener has the formula $C_{28}H_{20}S_2O_6Na_2$; and
   a layer of joint compound covering the identifiable wallboard joint tape, wherein under standard lighting conditions, said optical brightener is invisible and wherein said identifiable wallboard joint tape is visible and visually distinguishable under UV light from the wallboard joint.

7. The identifiable wallboard joint of claim 6, wherein said optical brightener is applied on said web of wallboard joint tape in a pattern.

8. An identifiable wallboard joint, comprising:
   two wallboard panels having a wallboard joint therebetween:
   an identifiable wallboard joint tape applied to the wallboard joint, wherein the identifiable wallboard joint tape comprises a web of liquid permeable paper wallboard joint tape integrally incorporated with an optical brightener, which is formed by applying an aqueous solution having the optical brightener in a concentration of 0.0069 weight percent to the web of wallboard joint tape, and wherein the applying is by embedding, coating, spraying, dipping, rolling, mist rolling, stamping, printing or otherwise surface treating said web of wallboard joint tape; and
   a layer of joint compound covering the identifiable wallboard joint tape, wherein under standard lighting conditions, said optical brightener is invisible and wherein said identifiable wallboard joint tape is visible and visually distinguishable under UV light from the wallboard joint.

9. The identifiable wallboard joint of claim 8, wherein said optical brightener is applied on said web of wallboard joint tape in a pattern.

* * * * *